(12) United States Patent
Tosukhowong et al.

(10) Patent No.: US 11,636,093 B2
(45) Date of Patent: Apr. 25, 2023

(54) REDUCING DATA LOSS IN REMOTE DATABASES

(71) Applicant: Microsoft Technology Licensing, LLC, Redmond, WA (US)

(72) Inventors: Teera Tosukhowong, Redmond, WA (US); Samarth Bhagwat, Redmond, WA (US); Dmitry Pimenov, Redmond, WA (US); Caroline Brown, Seattle, WA (US); Gergely Kota, Kirkland, WA (US); David Mowatt, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/348,097

(22) Filed: Jun. 15, 2021

(65) Prior Publication Data

US 2021/0311928 A1    Oct. 7, 2021

Related U.S. Application Data

(62) Division of application No. 16/018,001, filed on Jun. 25, 2018, now abandoned.

(51) Int. Cl.
*G06F 16/23* (2019.01)

(52) U.S. Cl.
CPC ...... *G06F 16/2365* (2019.01); *G06F 16/2379* (2019.01)

(58) Field of Classification Search
CPC ............ G06F 16/2365; G06F 16/2379
See application file for complete search history.

(56) References Cited

U.S. PATENT DOCUMENTS

| 2004/0210362 | A1* | 10/2004 | Larson | G01B 21/26 |
| | | | | 701/34.3 |
| 2007/0198518 | A1* | 8/2007 | Luchangco | G06F 16/2315 |
| 2012/0127523 | A1* | 5/2012 | Terashita | G06F 3/1236 |
| | | | | 358/1.15 |
| 2014/0372285 | A1* | 12/2014 | Bryant | G07F 19/209 |
| | | | | 705/39 |

(Continued)

OTHER PUBLICATIONS

"Notice of Allowance Issued in European Patent Application No. 19735439.2", dated Apr. 6, 2022, 7 Pages.

(Continued)

*Primary Examiner* — Allen S Lin
(74) *Attorney, Agent, or Firm* — NovoTechIP International PLLC

(57) ABSTRACT

Systems and methods for reducing data loss in remote databases. One method includes detecting, with an electronic processor communicatively coupled to the remote database, a failure of a user session with the remote database. The method includes, in response to determining the failure of the user session, performing, with the electronic processor, an offline detection check for the user session, the offline detection check including a canary check on a known resource related to the remote database. The method includes, in response to the offline detection check indicating that the remote database is offline, setting the user session to read-only, displaying, within a graphical user interface of the user session, an offline indicator, and graphically marking the at least one outstanding request within the user session.

15 Claims, 6 Drawing Sheets

(56) References Cited

U.S. PATENT DOCUMENTS

| | | | |
|---|---|---|---|
| 2015/0178757 A1* | 6/2015 | Moshal | H04L 63/083 705/14.26 |
| 2015/0364190 A1* | 12/2015 | Aue | G11C 13/0033 365/222 |
| 2017/0193602 A1* | 7/2017 | Studnitzer | G06Q 40/04 |
| 2018/0032203 A1* | 2/2018 | Sepulveda | G06F 3/016 |
| 2019/0065243 A1* | 2/2019 | Eckert | G06F 9/3009 |

OTHER PUBLICATIONS

"Decision to Grant Issued in European Patent Application No. 19735439.2", dated Jun. 30, 2022, 2 pages.

* cited by examiner

REDUCING DATA LOSS IN REMOTE DATABASES

FIELD

Embodiments described herein relate to reducing data loss in remote databases and data services, and, more particularly, to handling unresolved service requests at the end of a user session.

SUMMARY

Many users and organizations use cloud-based systems to enter and edit data, create, store, and edit documents, and the like. In such systems, documents and data are stored remotely from the user on a database and accessed with, for example, a web-based application, a user may access and use through a browser application. For example, a user may enter data into the fields of a table of the remote database, which is presented through the web-based application. However, when a user enters a value in a field representing a cell in a database record, the database record does not match the entered value until the data present in the field on the graphical user interface displayed by the browser application is written or committed to the database. In some instances, a user may attempt to exit the application before receiving confirmation that the data is written to the database. This can lead to inconsistencies in or loss of data stored in the remote database.

To address this concern, some browser applications store a local version of the data being edited or entered on a user device. However, some browser applications may not support this capability for security or administrative reasons. For example, a shared public computing device may not allow local storage of such data. Furthermore, this approach only maintains consistency with the remote database when (and if) a specific client reconnects to the remote database at a later point. For example, if a user using a tablet computer closes a document before changes have been synchronized and then opens that same document on his or her mobile phone, the user will not see the most recent changes. This approach may lead to increased data inconsistency in multi-user collaborative environments, where multiple clients store multiple versions of the data locally. However, restricting use of the data to a single user (for example, where a document or table may be "checked out" by a user) to mitigate those issues inhibits collaboration among users.

Thus, embodiments described herein provide, among other things, systems and methods for reducing data loss in remote databases. For example, when a user initiates a request to exit a user session with a remote database (a request to exit a particular page or view presented within a browser application or exit the entire user session), the browser application determines whether there are any outstanding requests (for example, outstanding write requests) that must complete before exit. If there are outstanding requests, the browser application presents a dialog to the user. The browser application presents the dialog to the user and waits for a predetermined period of time. When the time has expired, if the outstanding requests have been confirmed (for example, the write requests have all be fulfilled), then the browser application grants the exit request. However, if there are still outstanding requests, the browser application may display a second dialog. The second dialog may communicate to the user an estimated time before the outstanding write requests may be fulfilled, how significant the risk of data loss is (for example, depending on the type of data manipulation that has not yet been committed), or the like. For example, the second dialog may be based on a series of checks performed by the browser application regarding the state of the user's session. In particular, the browser application may determine the criticality, number, and type of outstanding requests. The browser application may also use telemetry data (for example, an average of the round trip times for the write requests made during the current user session, other user sessions, or a combination thereof) and the number of outstanding requests to estimate the time before the requests may be fulfilled. The second dialog may include a selection mechanism for exiting the user session without waiting for the outstanding requests to be fulfilled. As a result, embodiments described herein increase the likelihood that data manipulations (edits, insertions, deletions, copies, and the like) entered through a browser application are committed upon exit, thereby reducing data loss in the remote database, while providing the user with control and insight on whether to wait for the requests to be fulfilled.

As noted above, the browser application may estimate a time before requests are fulfilled based on telemetry data. In some embodiments, the telemetry data is for the current user session, previous user sessions associated with the same user or a combination therefore. Also, in some embodiments, user session telemetry data, time estimates, or a combination thereof may be stored to a session metadata table for the remote database. Thus, in some embodiments, applications communicating with the remote database 104 may access this session metadata table to share telemetry data, which can be used to provide dialogs to users regarding when a session is safe to exit, manage workflow, or a combination thereof. Also, in some embodiments, user session telemetry data, time estimates, or a combination may be shared between applications directly, such as via an application programming interface (API). Using such embodiments, a browser application may estimate the time needed to fulfill outstanding requests using telemetry data for other users that have or are performing similar operations under similar circumstances.

In addition to or as an alternative to checking for outstanding requests when an exit request is received, embodiments described herein may also identify when a user session has entered a degraded state (for example, when a user session has lost a connection to the remote database), and further reduce the likelihood of data loss by placing the table or document in a locked (read-only) state, which prevents the entry of changes that would be lost upon exit because they cannot be written remotely. Dialogs may also be presented to a user to inform the user of the identified degraded state, provide estimates of when a connection may be restored, inform a user of a degree of risk if a connection cannot be reestablished, or a combination thereof. In some embodiments, a browser application is also configured to mark data manipulations, such as individual database cells or fields, that have not yet been committed to the remote database when a degraded state has been identified. Similar markings may also be used when an exit request is received as described above.

Accordingly, the embodiments described herein augment the user experience with remote databases and other data and communicate the risk of data loss to a user (and, optionally, to other applications accessing the remote database) in various conditions.

For example, one embodiment provides a system for reducing data loss in a remote database. The system includes at least one electronic processor communicatively coupled to the remote database. The at least one electronic processor is configured to receive a user input requesting to exit a user session with the remote database. The at least one electronic processor is configured to, in response to receiving the user input, determine whether there is at least one outstanding request for the user session. The at least one electronic processor is configured to, in response to determining that there is at least one outstanding request for the user session, display a first dialog including a message informing a user to wait while the at least one outstanding request is being fulfilled. The at least one electronic processor is configured to, after a predetermined wait time has expired, determine whether the at least one outstanding request has been fulfilled. The at least one electronic processor is configured to, in response to determining that the at least one outstanding request has not been fulfilled, perform a request fulfillment check on the at least one outstanding request and display a second dialog. The second dialog includes a message based on the request fulfillment check informing the user of the at least one outstanding request and includes a control for exiting the user session without waiting for the at least one outstanding request to be fulfilled.

Another embodiment provides a method for reducing data loss in a remote database. The method includes detecting, with an electronic processor communicatively coupled to the remote database, a failure of a user session with the remote database. The method includes, in response to determining the failure of the user session, performing, with the electronic processor, an offline detection check for the user session, the offline detection check including a canary check on a known resource related to the remote database. The method includes, in response to the offline detection check indicating that the remote database is offline, setting the user session to read-only, displaying, within a graphical user interface of the user session, an offline indicator, and graphically marking the at least one outstanding request within the user session.

A further embodiment provides a non-transitory computer-readable medium including instructions executable by an electronic processor to perform a set of functions. The set of functions includes receiving a user input requesting to exit a user session with a remote database. The set of functions includes, in response to receiving the user input, determining whether there is at least one outstanding request for the user session. The set of functions includes, in response to determining that there is at least one outstanding request for the user session. The set of functions includes, displaying a first dialog including a message informing a user to wait while the at least one outstanding request is being fulfilled. The set of functions includes, after a predetermined wait time has expired, determining whether the at least one outstanding request has been fulfilled. The set of functions includes, in response to determining that the at least one outstanding request has not been fulfilled, displaying a second dialog. The second dialog includes a message based on the at least one outstanding request and includes a control for exiting the user session without waiting for the at least one outstanding request to be fulfilled.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
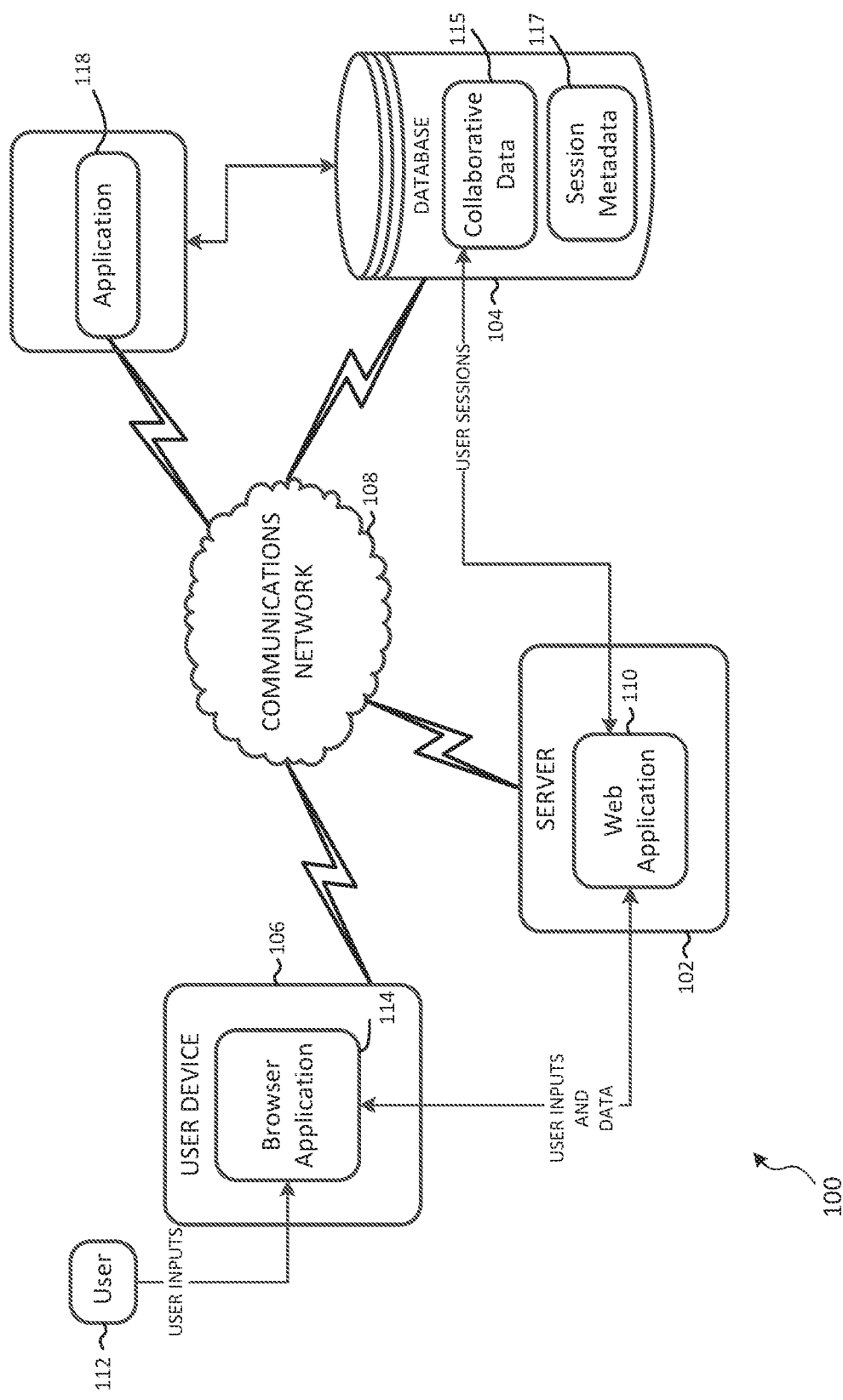
FIG. 1 schematically illustrates a system for accessing a remote database according to some embodiments.

As noted above, embodiments described herein provide one or more components configured to identify various attributes of a user session with a remote database or service, which can be used to balance the risk of data loss occurring and the amount of user dialogs a user sees. For example, FIG. 1 schematically illustrates a system 100 for accessing a remote database according to some embodiments. In the example illustrated in FIG. 1, the system 100 includes a server 102, a remote database 104, and a user device 106. It should be understood that the system 100 is provided as an example and, in some embodiments, the system 100 may include additional components. For example, the system 100 may include multiple servers 102, multiple remote databases 104, multiple user devices 106, or combinations thereof. In particular, it should be understood that although FIG. 1 illustrates a single user device 106, the system 100 may include tens, hundreds, or thousands of user devices (used by associated users).

The server 102, the remote database 104, and the user device 106 are communicatively coupled via a communications network 108. The communications network 108 may be implemented using a wide area network, such as the Internet, a local area network, such as a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof.

As illustrated in FIG. 1, to provide the services described herein, the server 102 communicates with the remote database 104. The remote database 104 (or portions thereof) may be housed on a suitable database server communicatively coupled to and accessible by the server 102. In some embodiments, the remote database 104 is part of a cloud-based database system external to the system 100 and accessible by the server 102 over one or more additional networks. Also, in some embodiments, the remote database 104 (or portions thereof) may be included in the server 102. As also noted above, in some embodiments, the server 102 is configured to communicate with multiple remote databases 104. Furthermore, in some embodiments, the functionality described herein as being provided by the server 102 may be distributed over multiple servers.

Again, as noted above, embodiments described reduce data loss for the remote database 104 when the remote database 104 is accessed by a user, such as through a web application 110 operating on the server 102 that the user device 106 communicates with using a browser application 114. In some embodiments, the remote database 104 stores collaborative data 115 (that is, data stored, retrieved, and edited by multiple users working in collaboration via the web application 110). For example, the web application 110 may be a collaborative database tool that allows multiple users to access and edit a database. In another example, the web application 110 may provide collaborative access and editing of documents, stored in the remote database 104. For example, in some embodiments, the web application 110 is one of the Microsoft Office® 365 suite of applications (for example, Outlook®, Word®, Excel®, PowerPoint®, and the like). It should be understood that in some embodiments, a user device 106 communicates with the web application 110 using a dedicated client application in lieu of the browser application 114. Furthermore, although the application 110 is referred to herein as a "web application," the application 110 may be accessible by a user device 106 over any type of communications network 108 and is not limited to Internet-enabled applications. Similarly, in some embodiments, the user device 106 may communicate with the application 110 over a dedicated wired or wireless connection with the server 102.

As described in more detail below with respect to FIG. 3 and FIG. 6, the browser application 114 implements methods to prevent data loss in the remote database 104 as users (for example, the user 112) access and use the web application 110. As illustrated in FIG. 1, the user 112 provides inputs and data to the web application 110 via the browser application 114. The web application 110 opens a user session to the remote database 104 to allow the user 112 to access and edit data from the remote database 104. A user session may be, for example, a particular table view of a database, a word processing document opened for editing, and the like.

During a user session, the browser application 114, the server 102 (the web application 110), or both gathers telemetry data (for example, data relating to the quality and speed of the connection to the remote database 104 via the web application 110) for the user session. The collected telemetry data may be stored locally on the user device 106, on the server 102, on the remote database 104, or a combination thereof. For example, as illustrated in FIG. 1, in some embodiments, telemetry data is stored to a session metadata table 117 included in the remote database 104. However, in other embodiments, the session metadata table 117 (or portions thereof) may be stored in a data storage device separate from the remote database 104. Applications communicating with the remote database 104 may access the session metadata table 117 to share telemetry data for user sessions with the remote database 104 managed by one or more applications and use this telemetry data to estimate times, generate dialogs, manage workflow, or a combination thereof. In some embodiments, applications can also similarly share estimated times using the session metadata table.

In addition to or as an alternative to the session metadata table 117, applications may share telemetry data, estimated times, or the like using an application programming interface (API). The API may allow an application to access data stored in the session metadata table 117 or directly access data (telemetry data, estimated times, and the like) from other applications that interact with the remote application. For example, using the API, the browser application 114 can share telemetry data, estimated times, and the like with an application 118 (for example, executed by a computing device separate from the user device 106 and the server 102) that also communicates with the remote database 104. As noted above, this shared telemetry data and time estimations allows an application to gain insight into the performance or workload on the remote database 104, which can be used to generate dialogs, estimate times for fulfilling requests, identify when the remote database 104 is offline or otherwise unavailable, manage workflow, and the like.

In some embodiments, the browser application 114, the server 102 (the web application 110), or both, monitor multiple user sessions to collect telemetry data. In some embodiments, the telemetry data, time estimates, dialogs, and the like used by the browser application 114, the server 102, or both may be based on similarities between the users. Similarities include, for example, whether the users are saving similar data, whether the users are being served by the same servers in the same data centers, whether the users are being served concurrently with a similar number of other users (that is, system load conditions), and the like. In such embodiments, the system 100 can produce a model, which can estimate one user's likely duration based not only on data about that user but also on data gathered from other users' activities.

In some embodiments, the browser application 114, the server 102, or both provide an administrative portal that can be used to enter and customize thresholds, metrics, timeouts, dialog language, and the like for use with the methods described below with respect to FIG. 3 and FIG. 6. In some embodiments, the administrative portal is included as part of the browser application 114, the web application 110, or both. However, in other embodiments, the administrative portal is a separate application executed by the user device 106, the server 102, or a separate computing device. In some embodiments, other mechanisms may be used to apply settings (for example, an administrative script or an in-product option).

In addition to or as an alternative to the administrative portal, in some embodiments, various machine learning functions to can be used set thresholds, determine the risk of data loss, and generate dialogs, as described herein that may otherwise be configurable through the administrative portal. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data and progressively refine algorithms for data analytics.

Figure 2:
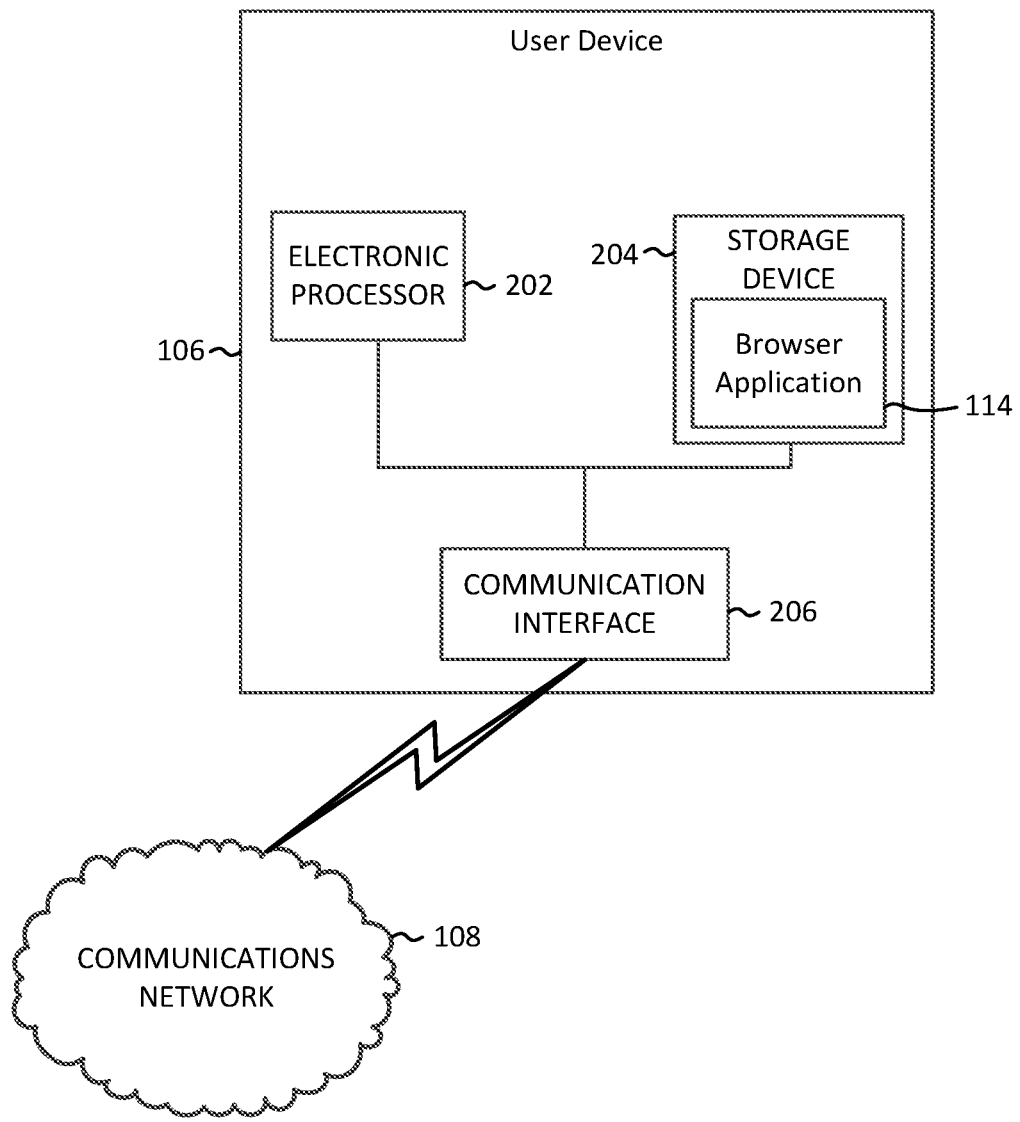
FIG. 2 is a block diagram of a server included in the system of FIG. 1 according to some embodiments.

The user device 106 is a personal computing device (for example, a desktop computer, a laptop computer, a terminal, a tablet computer, a smart telephone, a wearable device, or the like). As noted above, a user uses the user device 106 (the browser application 114 as executed by an electronic processor) to access functionality provided by the server 102 via the communications network 108. In particular, the browser application 114 establishes a user session with the remote database 104 via the web application 110, which forms a communicative coupling between the browser application and the remote database 104. FIG. 2 schematically illustrates the user device 106 in more detail. As illustrated in FIG. 2, the user device 106 includes an electronic processor 202 (for example, a microprocessor, application-specific integrated circuit (ASIC), or another suitable electronic device), a storage device 204 (for example, a non-transitory, computer-readable storage medium), and a communication interface 206, such as a transceiver, for communicating over the communications network 108 and, optionally, one or more additional communications networks or connections. It should be understood that the user device 106 may include additional components than those illustrated in FIG. 2 in various configurations and may perform additional functionality than the functionality described in the present application. For example, the user device 106 also includes (or communicates with) one or more input devices, output devices, or a combination thereof, such as a keyboard, a touchscreen, a display device, a speaker, a microphone, or the like. Also, it should be understood that the functionality described herein as being performed by the user device 106 may be distributed among multiple devices, such as one or more servers and may be provided through a cloud computing environment, accessible by components of the system 100 via the communications network 108.

The electronic processor 202, the storage device 204, and the communication interface 206 included in the user device 106 communicate wirelessly, over one or more communication lines or buses, or a combination thereof. The electronic processor 202 is configured to retrieve from the storage device 204 and execute, among other things, software for performing the control processes and methods described herein (which may be included as part of the browser application 114).

The server 102 includes similar components as the user device 106 (an electronic processor, storage device, and a communication interface). It should be understood that the functionality described herein as being performed by the user device 106 (or a portion thereof) may be performed at the server 102, such as via the web application 110 or a separate application or add-in. For example, the estimations, dialogs, checks, and related logic described herein as being performed by at the user device 106 (by the browser application 114) may be performed fully or partially at the server 102 (by the web application 110). In particular, in some embodiments, the server 102 may have access to additional information regarding the state of the remote database 104. However, performing logic at the server 102 may limit the use of such logic when connection between the user device 106 and the server 102 is slow or lost.

Figure 3:
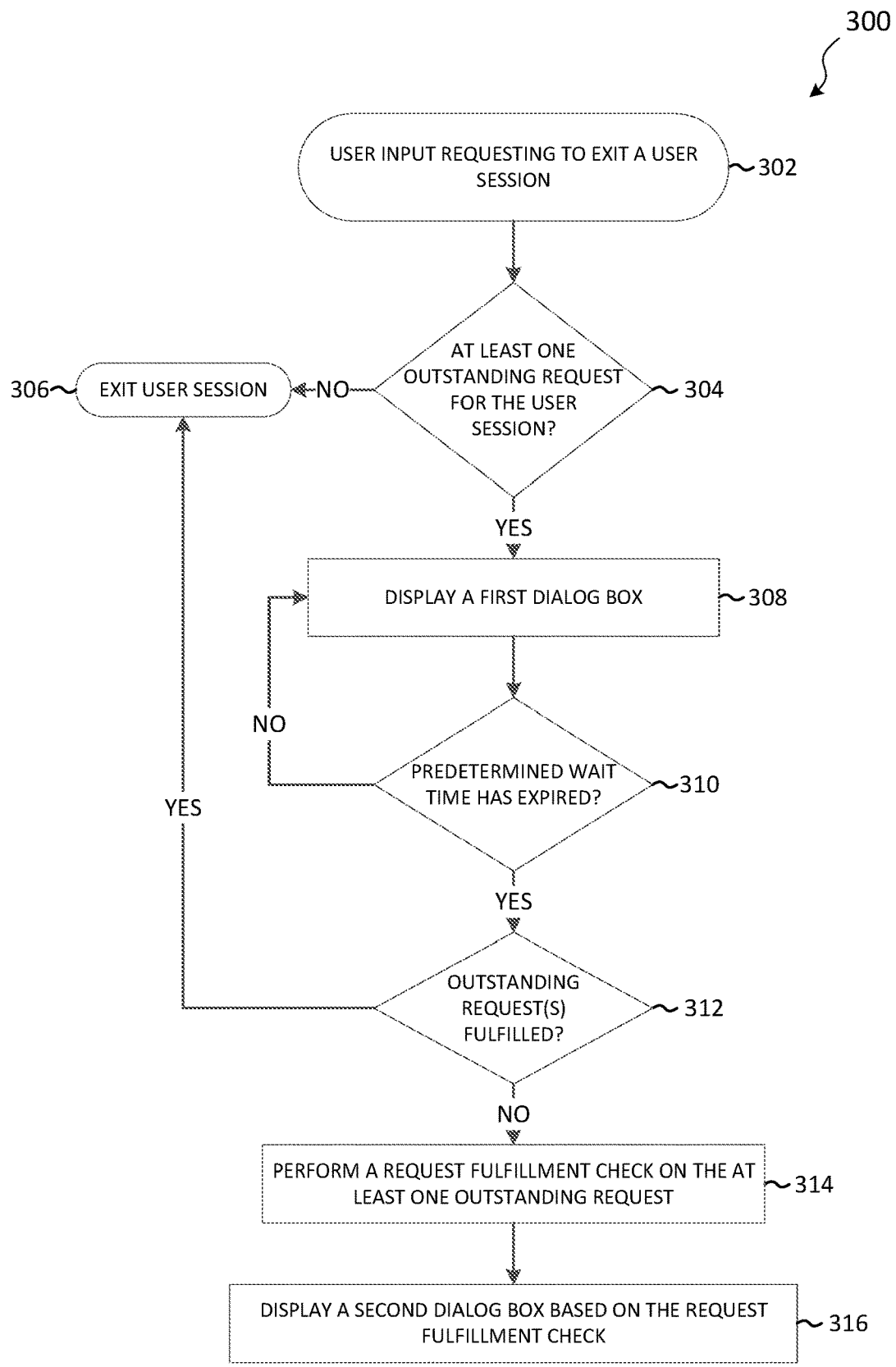
FIG. 3 is a flowchart illustrating a method for reducing data loss in a remote database using the system of FIG. 1 when an exit request is received according to some embodiments.

FIG. 3 illustrates an example method 300 for reducing data loss in a remote database when an exit request is received. The method 300 is described as being performed by the user device 106 and, in particular, the electronic processor 202 executing the browser application. However, it should be understood that in some embodiments, portions of the method 300 may be performed by other devices, including for example, the server 102 as noted above. The method 300 is also described in terms of reducing data loss for a single remote database 104 being accessed through the web application 110. However, it should be understood that embodiments of the method 300 may be used for reducing data loss for multiple remote databases accessed through one or more applications.

As illustrated in FIG. 3, the browser application 114 receives a user input requesting to exit a current user session with and the remote database 104 (at block 302). Such an exit request may include a request to leave a current page or view provided by the browser application 114 or exit the entire user session. For example, an exit request may occur when a user clicks an exit button within the browser application 114, closes an open document within the browser application 114, exits from a database table within the browser application 114, selects the back button on the browser application 114, attempts to close the browser application 114, navigates to another context or view within the browser application 114, or the like.

In response to receiving the exit request, the browser application 114 determines whether there is at least one outstanding request for the user session (at block 304). As used herein, the term "outstanding request" refers to an uncommitted data entry, an unsynchronized data entry, or both. An uncommitted data entry represents data (a data manipulation) received from a user within the browser application 114, that has not be committed by the user for writing or synchronization with the remote database 104. For example, a user may have entered a value into a database field but may have not pressed the enter key or moved the cursor from the field to trigger a writing of the value to the remote database 104. In contrast, an unsynchronized data entry represents data (a data manipulation) received from a user within the browser application 114 that has been committed by the user for writing or synchronization with the remote database 104 but such synchronization has not yet completed (referred to herein as being "fulfilled"). In some embodiments, the browser application 114 maintains a queue of such committed data entries or manipulations that have not yet been synchronized with the remote database 104.

In some instances, a user may not have made any changes since their last save or changes may have been successfully synchronized with the remote database 104 before the exit request is received. Accordingly, in this situation, when there are no outstanding requests for the user session (at block 304), the user session is exited as requested (at block 306). Existing the user session may cause the browser application 114 on the user device 106 to close or switch to a different new page.

Figure 4A:
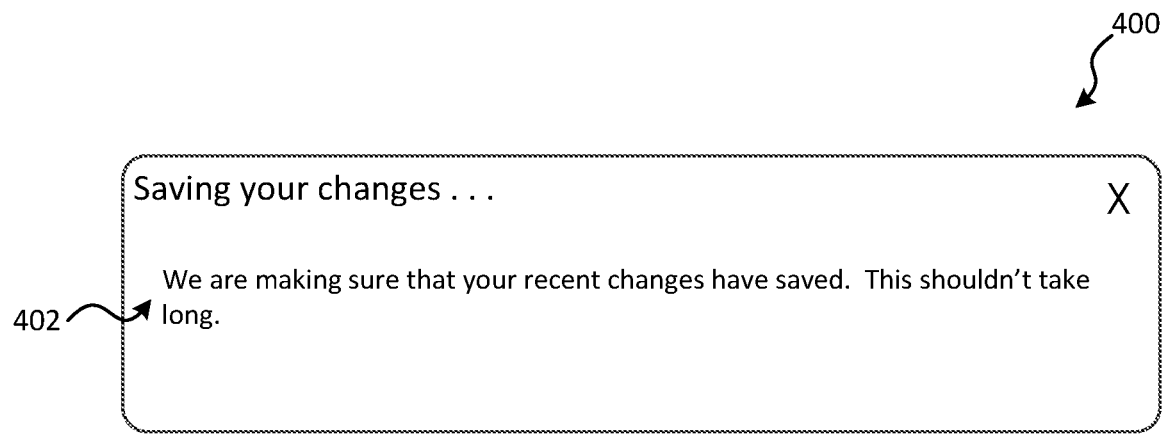
FIGS. 4A, 4B, and 5 illustrate a graphical user interface element for use with the system of FIG. 1 according to some embodiments.

Alternatively, when there is at least one outstanding request, exiting the user sessions as requested by the user may result in data loss because data received from the user may not be successfully synchronized with the remote database 104. Accordingly, when the browser application 114 determines that there is at least one outstanding request for the user session (at block 304), the browser application 114 displays a first dialog (at block 308). For example, as illustrated in FIG. 4A, a first dialog 400 may include a message 402 informing the user that changes are being saved and advising the user to wait a short time. In some embodiments, the first dialog does not include a mechanism for receiving any type of user input (such as canceling the exit or forcing the exit). The first dialog may be presented as a pop-up box or as a notification within a toolbar or other portion of a graphical user interface provided via the browser application 114.

Returning to FIG. 3, when there is at least one outstanding request, the browser application 114 waits for the outstanding requests to complete. In particular, after a predetermined wait time has expired (at block 310), the browser application 114 determines whether the at least one outstanding request has been fulfilled (at block 312). In some embodiments, the browser application 114 determines that a request has been fulfilled by receiving a confirmation message or acknowledgment from the remote database 104. In some embodiments, the predetermined wait time is set to provide ample time for the outstanding requests to complete, but not so long that user frustration develops (for example, 5 seconds). In some embodiments, the predetermined wait time is static such that it does not depend on the user session, outstanding requests, or the like. In other embodiments, the predetermined wait time is dynamic such that depends on the user session, outstanding requests, or the like. For example, in some embodiments, the predetermined wait time is set based on an average network latency or other factors that may affect how long it may take for outstanding requests to complete, such as a number of outstanding requests. Similarly, in some embodiments, the browser application 114 intelligently determines the predetermined wait time based on current and historical network conditions for the user device 106, session telemetry retrieved from the remote database 104, and the like.

When, after the predetermined wait time has elapsed, all of the outstanding requests have been fulfilled (at block 312), the browser application 114 exits the user session as requested (at block 306). In some embodiments, the browser application 114 exits the user session as soon as all of the outstanding requests have been fulfilled without waiting for the predetermined wait time to elapse.

Alternatively, when, after the predetermined wait time has elapsed, there is still at least one outstanding request that has not been fulfilled (at block 312), the browser application 114 performs a request fulfillment check on the at least one outstanding request (at block 314). The request fulfillment check is used to customize further dialogs presented to the user based on the outstanding requests that still have been be fulfilled as described below.

In some embodiments, the browser application 114 performs a request fulfillment check by determining a request type for any outstanding requests, a criticality for any outstanding requests, or both. Request types may designate a type of data entry or manipulation that has not yet been synchronized with the remote database 104, such as inserting a new entry into a database field, changing the location of the cursor within a document, or the like. The criticality of a request may designate how important an outstanding request is, for example, as compared to other outstanding requests, which may depend on the request type of an outstanding request. For example, a request to log a cursor location in a document file may not as critical as a request to update the format of a document, add a database schema, or other requests that fundamentally change a document that may be shared among many users. In some embodiments, each type of request may be associated with a predetermined criticality, which may be a numerical value or a categorization (low, medium, high).

In some embodiments, the browser application 114 may be built by a different software manufacturer than that of the server 102, database 104, or both. In such embodiments, the request fulfillment check performed by the browser application 114 (and the ability to process the response) may be made through a documented API call. Such embodiments may include further APIs for sending and receiving the user session telemetry data. In some embodiments, the business logic used to govern the user experience may be provided in a library provided by the software vendor(s) of the server 102, the remote database 104, or both, or such logic may be built by the browser application's author, or by another party.

Alternatively or in addition, the browser application 114 may perform a request fulfillment check by determining whether an outstanding request is conditionally chained to the success of another of outstanding request. For example, a request to input data into a new row for a table is conditioned on successfully adding the row to the table. When the initial request to create the row is not fulfilled, attempts to synchronize data for that row will likely not succeed. This information may allow the browser application 114 to better estimate a time needed to fulfill the remaining outstanding requests.

Alternatively or in addition, the browser application 114 may perform a request fulfillment check by determining a data loss risk level for the user session, which may be based on the request type, criticality, conditioning chain, or combination thereof of each outstanding request as described above. The data loss risk level indicates how likely it is that data may be lost or how much data may be lost if the outstanding requests are not fulfilled. For example, in some embodiments, the browser application 114 determines a data loss risk level based on requested schema changes to the remote database 104, a quantity of conditionally chained outstanding requests, an estimated time to fulfill the outstanding request or requests, or a combination thereof. For example, when a high quantity of chained outstanding requests exists, the likelihood of data loss may increase because some of the requests cannot be attempted until others are fulfilled. In contrast, a quantity of non-chained requests may be completed in parallel, which may take less time and, thus, decrease the possibility of data loss.

Similarly, in some embodiments, the browser application 114 uses the estimated time to fulfill the outstanding requests to determine the data loss risk level (for example, the longer the estimated time, the higher the risk that some data may be lost and, hence, the higher the risk level). In some embodiments, the browser application 114 determines the estimated time based on telemetry data for the user session. The telemetry data may include a duration for a recently-fulfilled request for the user session, an average duration of two or more fulfilled requests for the user session, a measure of network latency (for example, a round trip time), browser processing delays, or the like. Processing delays may be caused by processing on the browser application 114 on the user device 106 (for example, complex analysis operations performed in JavaScript™, photo upload functions, and the like). In some embodiments, the browser application 114 may also receive telemetry data for other applications communicating with the remote database 104 separate from the user session (for example, from the remote database 104 or through an API). For example, as described above, in some embodiments, when the browser application 114 determines the estimated time, the browser application 114 shares the telemetry data, the estimated time, or both to a second application (for example, the application 118). As also described above, the browser application 114 may share this information by storing the information in a table or other data structure accessible by the second application, via an API, or a combination thereof. In some embodiments, the server 102 may indicate, for example, via an API, that it is under heavy load. It may be that load is experienced in one region but not another. In such instances, the browser application 114 may respond a user's request to exit by attempting to send any outstanding requests to a different data center for that service.

Figure 4B:
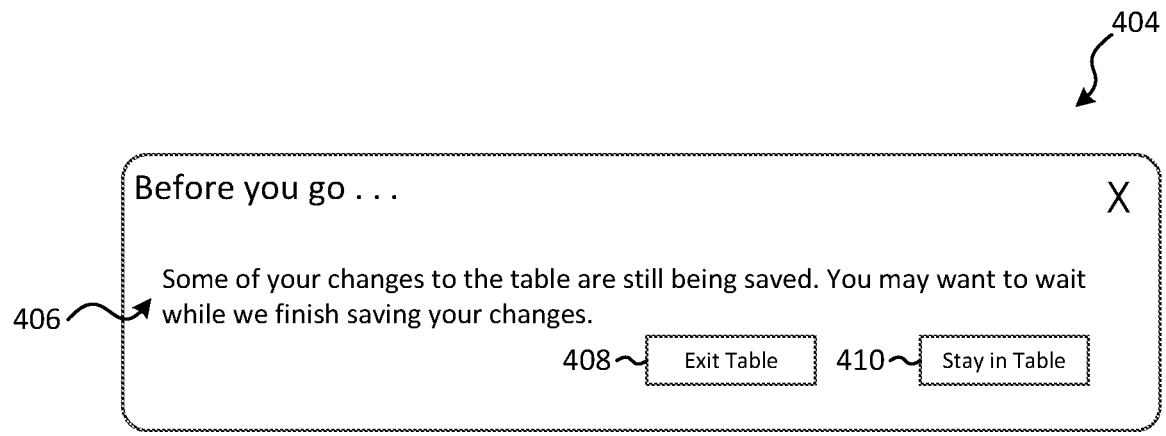

Based on the results of the one or more request fulfillment checks, the browser application 114 displays a second dialog based on the request fulfillment check (at block 316). FIG. 4B illustrates one example of such a second dialog. As illustrated in FIG. 4B, in some embodiments, the second dialog 404 includes a message 406 and, optionally, a control (selection mechanism) that allows a user to choose whether to wait for the outstanding requests to be fulfilled or, alternatively, force the request exit. For example, as illustrated in FIG. 4B, in some embodiments, the second dialog 404 may include an exit confirmation control 408 and a continuation control 410. The exit confirmation control 408 allows the user to disregard the risk and exit as originally requested (at block 302). The continuation control 410 allows the user to stay in the current user session (in the embodiment illustrated, to stay in a table). It should be understood that the controls for forcing an exit may be active or passive. For example, in some embodiments, the second dialog may include one or more controls (selection mechanism) that allow a user to actively wait or actively exit the user session. In other embodiments, the second dialog may inform the user of a default action (waiting or exiting) that may be performed automatically unless the user provide contrary input via one or more controls. In some embodiments, the second dialog is displayed until all outstanding requests are fulfilled or until a user takes an action, such as by closing the dialog or selecting one of the controls. However, regardless of how long the second dialog is displayed, the second dialog may be updated at various events or on a predetermined frequency to provide a user with any updated information, such as an updated estimated time to fulfill the outstanding requests, the number or types of requests remaining unfulfilled, or the like. In some embodiments, when criticality is low, no dialog may be produced to provide a better user experience. However, in some embodiments, when criticality is higher, then a dialog box is presented showing, for example, "this process typically takes 3 seconds," to reduce user confusion as to whether they are being asked to wait indefinitely.

In some embodiments, message included in the second dialog provides more granular information to the user regarding the outstanding requests, such as, for example, the request type, criticality, estimated data, data loss risk level, number of outstanding requests, number of outstanding requests with conditional chains, or a combination thereof. Alternatively or in addition, the message included in the second dialog may be based on one or more of these characteristics. For example, the second dialog may include a different message based on the data loss risk level, the estimated time, or the like. In particular, when the determined data loss risk level is high (greater than a predetermined threshold), the message included in the second dialog may inform the user that there is a high risk of data loss if the user exits now, for example, "You will likely lose the last 10 seconds of your work if you exit now. Please wait while we finish saving changes."

Figure 5:
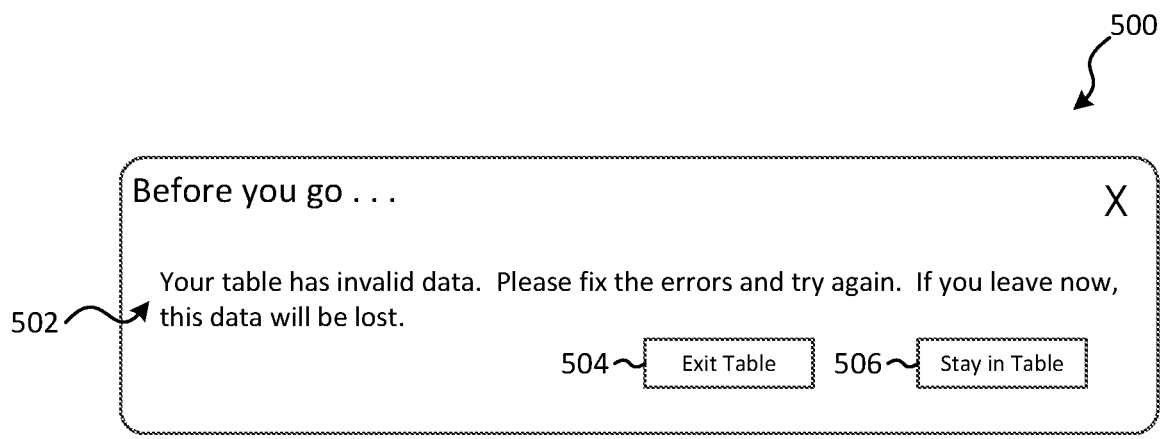

In some instances, a user may have entered errant or otherwise invalid data into a field or document via the browser application 114 but the entry may be included as one of the outstanding requests, such as one of the uncommitted entries. Accordingly, to prevent delaying an exit request due to invalid data (which should not be synchronized with the remote database 104 anyway), the browser application 114 may be configured to identify any such invalid data in response to receiving an exit request. For example, in some embodiments of the method 300, upon receiving a request to exit, the browser application 114 performs a validity check on any outstanding requests (for example, uncommitted data entries). In particular, when the outstanding requests include at least one uncommitted data entry, the browser application 114 may determine whether the at least one uncommitted data entry is valid. The browser application 114 may make this determination by comparing the data entry to a data template or other ruleset to determine whether the data entry is valid given its context (for example, valid for a specific field in a table). In some embodiments, in response to determining that an uncommitted data entry is invalid (for example, was a character string rather than a numerical value), the browser application 114 graphically marks the uncommitted data entry. For example, data entered or modified within the graphical user interface displayed as part of the user session may be graphically marked with highlighting, animation (blinking or flashing highlighting or content), bolding, or the like. In some embodiments, the browser application 114 also displays an invalid data dialog (see FIG. 5). The invalid data dialog may inform the user that the marked data is invalid and, thus, will not be synchronized with the remote database 104. In some embodiments, the invalid data dialog also includes a mechanism where a user can cancel the exit (to correct the invalid data) or confirm the exit. In other embodiments (if the only remaining outstanding requests include invalid data as described above), the browser application 114 may be configured to exit without committing such invalid data (for example, without marking the data) but may be configured to display a dialog informing the user that such invalid data will not be committed.

As noted above, in some embodiments, in addition to or as an alternative to tracking outstanding requests in response to receiving an exit request, the system 100 may be configured to detect degraded states of a user session and take one or more actions to prevent or reduce the risk of data loss. For example, FIG. 6 illustrates an example method 600 for reducing data loss in a remote database when the remote database 104 may be offline (or otherwise unavailable). The method 600 is described as being performed by the user device 106 and, in particular, the electronic processor 202 executing the browser application 114. However, it should be understood that in some embodiments, portions of the method 600 may be performed by other devices, including for example, the server 102. The method 600 is also described in terms of reducing data loss for a single remote database 104 using a single web application 110. However, it should be understood that embodiments of the method 600 may be used for reducing data loss for multiple remote databases accessed via one or more applications.

Figure 6:
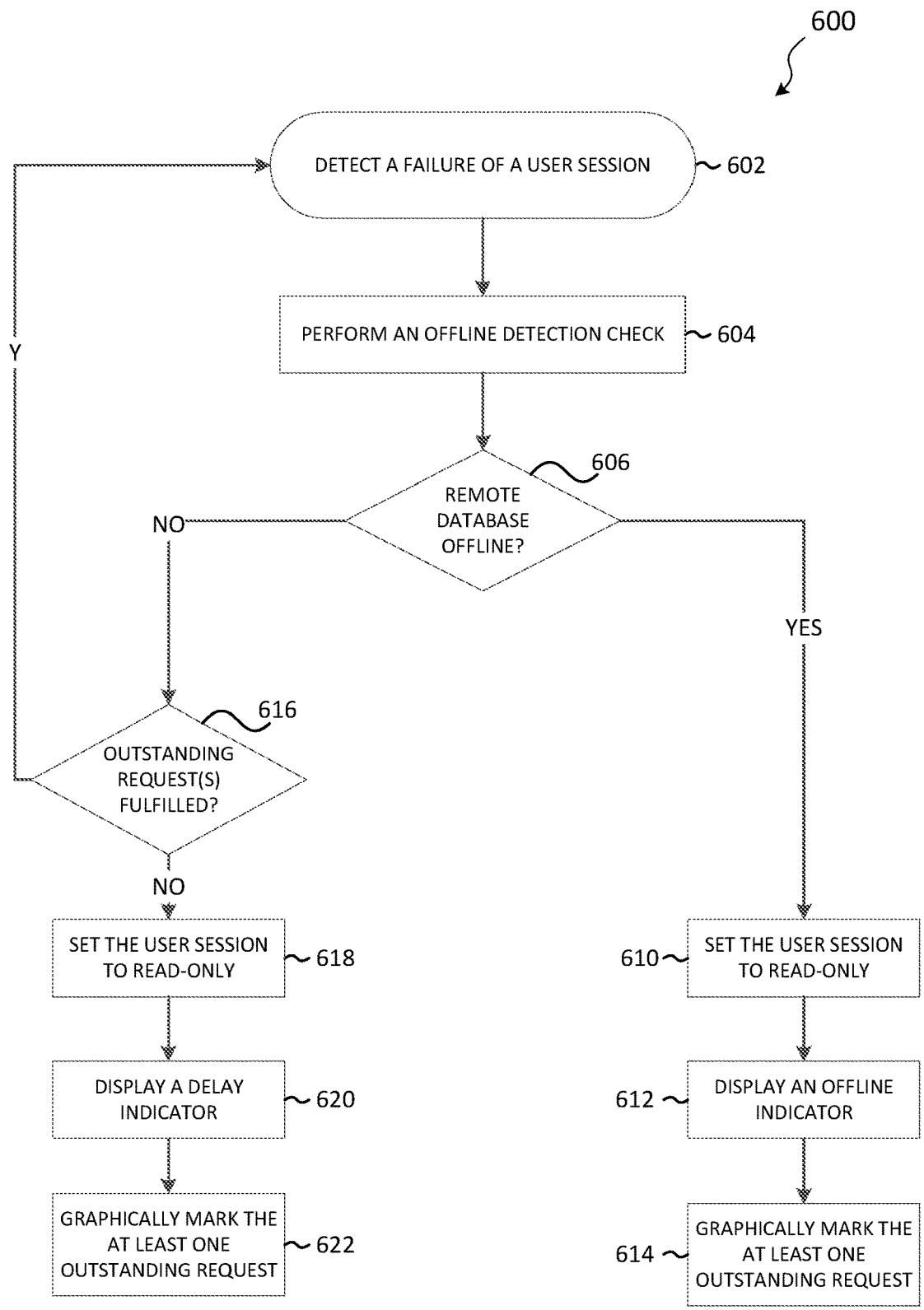
FIG. 6 is a flowchart illustrating a method for reducing data loss in a remote database using the system of FIG. 1 when a remote database may be offline according to some embodiments.

As illustrated in FIG. 6, in the method 600, the browser application 114 detects a failure of a user session (at block 602). In some embodiments, the browser application 114 detects such a failure by detecting a failure of an outstanding request associated with the user session. The browser application 114 may determine that the outstanding request has failed by comparing a pending time for the outstanding request to a predetermined threshold (for example, an estimated completion time for the request). In another example, the browser application 114 determines that the outstanding request has failed when the browser application 114 receives a failure indication (for example, from the remote database 104). In some embodiments, the browser application 114 detects a failure of a user session only when a failure occurs for at least two of a plurality of outstanding requests (that is, there are multiple failures). Similarly, in some embodiments, the browser application 114 detects a failure of a user session only when one or more failures of outstanding requests are detected within a predetermined time window. Also, in some embodiments, the browser application 114 detects a failure of a user session when a queue of outstanding requests exceeds a particular size or number of requests (for example, regardless of whether any such requests have failed). For example, a large queue of outstanding requests may indicate that delays or other errors are occurring (even if just intermittently) even if requests are being successfully fulfilled. It should be understood that, in some embodiments, outstanding requests may also include other types of requests or activities separate form data entries (writing data back to the remote database). For example, a request to log in to the web application 110 via the browser application 114 may be a request that can time out or result in a failure (for example, when a profile for the user is not available or otherwise cannot be fetched). Thus, detecting a failure of a user session as described herein is not limited to identifying failed or queued requests for data entries.

When the browser application 114 detects a failure of a user session, the browser application 114 performs an offline detection check (at block 604). The offline detection check determines whether the remote database 104 is offline or otherwise unreachable (for example, the connection to the remote database 104 has been lost). In some embodiments, as part of the offline detection check, the browser application 114 performs a "canary check" on a known resource related to the remote database 104. For example, the browser application 114 may ping the server 102 hosting the remote database 104 or attempt to open a connection to another known service operating on the same server 102 as the remote database 104. When one or more these canary checks fail (no response is received within a predetermined time period), the browser application 114 may determine that the remote database 104 is offline or otherwise unavailable.

Figure 7:
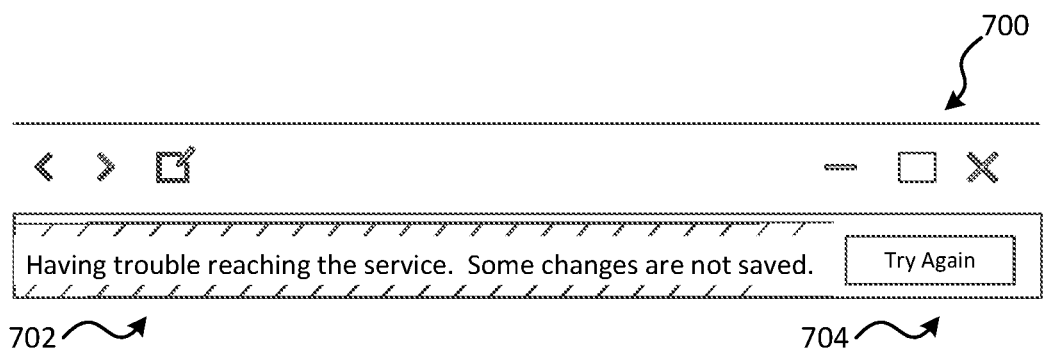
FIGS. 7 and 8 illustrate a graphical user interface element for use with the system of FIG. 1 according to some embodiments.

In response to the offline detection check indicating that the remote database 104 is offline (at block 606), the browser application 114 sets the user session to read-only (at block 610). For example, a database table or document currently opened by a user via the browser application 114 may be locked so that data can be read by the user but the user cannot make any edits or other data manipulations. In particular, because such data manipulations cannot be synchronized while the remote database 104 is offline, the browser application 114 prevents the user from making further entries to prevent outstanding requests from queuing up while the remote database 104 is offline, which limits the risk of data loss. In some embodiments, a user may still be allowed to manipulate the data but may be informed that such manipulations may not be synchronized with the remote database 104. For example, to inform the user of the read-only state of the user session, the browser application 114 may display an offline indicator (at block 612). As illustrated in FIG. 7, an offline indicator 700 may include a message 702 displayed within a toolbar or message bar. In some embodiments, the offline indicator also includes a control (selection mechanism) 704 that allows the user to force the browser application 114 to continue to check whether the remote database 104 is online or available again. In some embodiments, the browser application 114 may continue (at a predetermined frequency) to issue canary checks and may switch the user session back to a live or read-write session in response to a successful canary check. For example, the browser application 114 may be configured to retry outstanding requests with the remote database 104 (in a proper order according to condition chaining between requests as described above) in response to receiving a valid response to a canary check. In some embodiments, the frequency of canary checks or retries after a valid response to a canary check is received may be determined based on the outstanding requests, such as the number of requests, types of requests, estimated time, or the like, which the browser application 114 may determine as described above with respect to FIG. 3. Accordingly, the control 704 may also a user to force a new canary check or a retry.

In some embodiments, the browser application 114 also graphically marks modifications made by a user that have not been synchronized with the remote database 104 (at block 614). For example, any uncommitted or unsynchronized data displayed within a graphical user interface presented within the user session (data entries or edits) may be graphically marked as described above with respect to detected invalid data. Providing such graphical markings allows a user to see what edits (data manipulations) have and have not been successfully synchronized with the remote database 104, which may inform the user whether the risks of data loss warrants waiting for the remote database 104 to come back online or exiting the user session. Accordingly, it should be understood that such graphical markings may also be used with the method 300 of FIG. 3, to inform a user of what data entries have not be synchronized with the remote database 104 when the user requested the exit.

Figure 8:
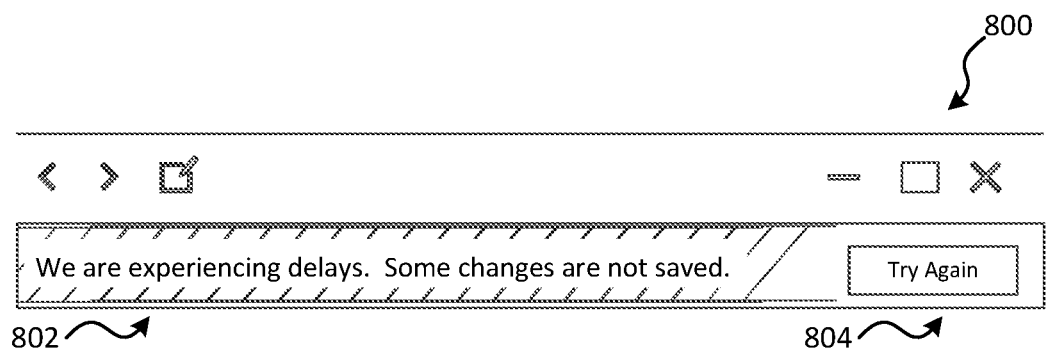

Returning to FIG. 6, alternatively, when the browser application 114 determines that the remote database 104 is not offline (at block 606), the browser application 114 determines whether there are any outstanding requests that have not yet been fulfilled (at block 616). For example, in cases of intermittent connectivity, some requests may have completed between an initial failure or offline state of the remote database 104 and the completion of the offline check (at block 606). When there are at least one outstanding request that has not been fulfilled (at block 616), the browser application 114 may also set the user session to read-only (at block 618), as described above. For example, if there have been failures to prompt an offline check and outstanding requests are still queued even through the remote database 104 is online, the browser application 114 may still switch the user session to the read-only mode to allow these queues requests to complete and also avoid further data loss that may occur if failure continue to occur. To inform the user of the read-only state of the user session, the browser application 114 may display a delay indicator (at block 620). As illustrated in FIG. 8, a delay indicator 800 may be similar to the offline indicator described above and may inform the user that some delays or intermittent failures have been detected and, hence, the user session is being placed in the read-only mode as a precaution. In some embodiments, as illustrated in FIG. 8, the delay indicator 800 also includes a control 804 that allows the user to force the browser application 114 to continue to check for a connection to the remote database 104 for completing the queue outstanding requests (for example, forced canary check as described above). In some embodiments, the browser application 114 also graphically marks data associated with outstanding requests (at block 622) as described above.

As illustrated in FIG. 6, when the remote database 104 is not offline (at block 606) and no outstanding requests have been queued (at block 616), the browser application 114 may maintain the current state of the user session but may continue to check for failures as described above (at block 602).

Thus, embodiments provide, among other things, systems and methods for reducing data loss in a remote database or other remotely-accessible systems and services. For example, as described above, such remotely-accessible systems and services pose a risk of data loss when a user session is exited before all outstanding requests have been fulfilled. Although, the exit can be hung while the requests are fulfilled, this process fails to give users control and insight into exit delays and may waste computer resources waiting. Accordingly, embodiments described herein provide various checks and estimation processes (performed at the user device) to prevent data loss. These checks can be used when an exit request is received as well as when the state of a user session degrades, such as when a connection to the remote database is lost or the remote database is otherwise unavailable. Telemetry data associated with users sessions can be used to provide a user with estimations of how long it will take for data to be synchronized or the likelihood of data synchronizations completing successfully. Such telemetry data may also be shared with other applications that may access the remote database, such as via an API. As noted above, although embodiments are described herein with reference to remote database, the methods and systems described herein may be used with other types of remotely-accessible services and systems, including for example, document processing services, messaging services, or the like.

Various features and advantages of some embodiments are set forth in the following claims.

What is claimed is:

1. A system for reducing data loss in a remote database, the system comprising:
   at least one electronic processor communicatively coupled to the remote database and configured to:
     receive a user input in an application on a user device requesting to exit a user session established between the application and the remote database;
     in response to receiving the user input, determine via the application whether there are any outstanding requests to be performed on the remote database for the user session;
   in response to the application determining that there is one or more outstanding requests for the user session,
     display a first dialog on the user device, the first dialog including a message informing a user to wait while the one or more outstanding requests are being fulfilled;
   after a predetermined wait time has expired, determine via the application whether there are any outstanding requests remaining to be fulfilled;
   in response to the application determining that there is at least one outstanding request remaining:
     perform a request fulfillment check on the at least one outstanding request using the application to check on a status of the outstanding request;
     display a second dialog on the user device, the second dialog including a message with information pertaining to the request fulfillment check and including a control for exiting the user session without waiting for the at least one outstanding request to be fulfilled; and
     in response to the control being actuated, cause the application to exit the user session.

2. The system of claim 1, wherein the at least one outstanding request includes at least one selected from a group consisting of an uncommitted data entry and an unsynchronized data entry.

3. The system of claim 1, wherein the at least one electronic processor is further configured to, in response to receiving the user input:
   when the at least one outstanding request includes at least one uncommitted data entry, determine whether the at least one uncommitted data entry is valid; and
   in response to determining that the at least one uncommitted data entry is not valid,
     graphically mark the uncommitted data entry, and
     display an invalid data dialog.

4. The system of claim 1, wherein the at least one electronic processor is configured to perform the request fulfillment check by determining at least one selected from a group consisting of a request type for the at least one outstanding request and a criticality for the at least one outstanding request.

5. The system of claim 1, wherein the at least one electronic processor is configured to perform the request fulfillment check by, when the at least one outstanding request includes a plurality of outstanding requests, determining whether any of the plurality of outstanding requests is conditionally chained to success of another of the plurality of outstanding requests.

6. The system of claim 1, wherein the at least one electronic processor is configured to perform the request fulfillment check by determining a data loss risk level for the user session based on the at least one outstanding request.

7. The system of claim 6, wherein the at least one electronic processor is configured to determine the data loss risk level based on at least one selected from a group consisting of requested schema changes to the remote database, a quantity of conditionally chained outstanding requests, and an estimated time to fulfill the at least one outstanding request.

8. The system of claim 1, wherein the at least one electronic processor is configured to perform the request fulfillment check by determining an estimated time to fulfill the at least one outstanding request based on telemetry data for the user session.

9. The system of claim 8, wherein the telemetry data is at least one selected from a group consisting of a duration for a recently-fulfilled request for the user session and an average duration of two or more fulfilled requests for the user session.

10. The system of claim 8, wherein the at least one electronic processor is further configured to transmit to a second application accessing the remote database at least one selected from the group consisting of the telemetry data and the estimated time.

11. Non-transitory computer-readable medium including instructions executable by an electronic processor to perform a set of functions, the set of functions comprising:
receiving a user input in an application on a user device requesting to exit a user session established between the application and a remote database;
in response to receiving the user input, determining with the application whether there are any outstanding requests to be performed on the remote database for the user session;
in response to the application determining that there is one or more outstanding requests for the user session:
displaying a first dialog on the user device, the first dialog including a message informing a user to wait while the one or more outstanding requests are being fulfilled;
after a predetermined wait time has expired, determining with the application whether there are any outstanding requests remaining to be fulfilled; and
in response to the application determining that there is at least one outstanding request remaining:
displaying a second dialog on the user device, the second dialog including a message with information pertaining to the at least one outstanding request and including a control for exiting the user session without waiting for the at least one outstanding request to be fulfilled; and
in response to the control being actuated, causing the application to exit the user session.

12. The non-transitory computer-readable medium of claim 11, the set of functions further comprising determining an estimated time to fulfill the at least one outstanding request based on telemetry data for the user session, wherein the message includes the estimated time.

13. The non-transitory computer-readable medium of claim 12, the set of functions further comprising sharing at least one selected from a group consisting of the telemetry data and the estimated time with an application communicating with the remote database separate from the user session.

14. The non-transitory computer-readable medium of claim 13, wherein sharing includes storing at least one selected from a group consisting of the telemetry data and the estimated time to a table accessible by the application.

15. The non-transitory computer-readable medium of claim 13, wherein sharing includes communicating at least one selected from a group consisting of the telemetry data and the estimated time with the application via an application programming interface.

* * * * *